United States Patent [19]
Jacobs

[11] Patent Number: 5,898,920
[45] Date of Patent: Apr. 27, 1999

[54] DATA COMMUNICATION USING A DUAL MODE RADIOTELEPHONE

[75] Inventor: Paul E. Jacobs, San Diego, Calif.

[73] Assignee: Qualcomm Incorportated, San Diego, Calif.

[21] Appl. No.: 08/636,261

[22] Filed: Apr. 25, 1996

Related U.S. Application Data

[63] Continuation of application No. 08/465,040, Jun. 6, 1995, abandoned, which is a continuation of application No. 08/152,160, Nov. 15, 1993, abandoned.

[51] Int. Cl.$^6$ .................................................. H04Q 7/32
[52] U.S. Cl. ...................................................... 455/422
[58] Field of Search ............................ 379/67, 79, 58; 380/23

[56] References Cited

U.S. PATENT DOCUMENTS

| | | | |
|---|---|---|---|
| Re. 34,034 | 8/1992 | O'Sullivan | 379/59 |
| 4,658,096 | 4/1987 | West, Jr. et al. | 379/59 |
| 4,697,281 | 9/1987 | O'Sullivan | 379/473 |
| 4,718,082 | 1/1988 | Parker et al. | 379/98 |
| 4,737,975 | 4/1988 | Shafer | 379/58 |
| 4,775,997 | 10/1988 | West, Jr. et al. | 379/58 |
| 4,829,554 | 5/1989 | Barnes et al. | 379/58 |
| 4,868,863 | 9/1989 | Hartley et al. | 379/98 |
| 4,922,517 | 5/1990 | West, Jr. et al. | 379/58 |
| 4,972,457 | 11/1990 | O'Sullivan | 379/59 |
| 5,119,397 | 6/1992 | Dahlin et al. | 375/5 |
| 5,127,041 | 6/1992 | O'Sullivan | 379/59 |
| 5,249,218 | 9/1993 | Sainton | 379/59 |
| 5,257,397 | 10/1993 | Barzegar et al. | 455/33.1 |
| 5,265,119 | 11/1993 | Gilhousen et al. | 375/1 |
| 5,359,626 | 10/1994 | Kloker et al. | 375/7 |
| 5,367,563 | 11/1994 | Sainton et al. | 379/98 |
| 5,416,829 | 5/1995 | Umemoto | 379/58 |
| 5,420,911 | 5/1995 | Dahlin et al. | 379/59 |
| 5,428,664 | 6/1995 | Kobayashi | 379/58 |

OTHER PUBLICATIONS

"Air Interface Protocols for a National Mobile Data Network", *IEE Colloq.*, by J B Hollis, Feb. 9, 1995, 6 pages (includes cover sheet).

Western Datacom, "Worldcom V.32bis", Feb. 1995.

Megahertz, "Megahertz PCMCIA Fax Modems with XJACK for Mobile Computers", Mar. 1994.

Cincinnati Microwave, "MC–Dart 100", Jan. 1993.

*Primary Examiner*—William Cumming
*Attorney, Agent, or Firm*—Russell B. Miller; Charles D. Brown; Roger W. Martin

[57] ABSTRACT

A data communication system which enables an electronic accessory, such as a computer, to communicate data in both an analog type radiotelephone system and a digital type radiotelephone system. The data communication system first determines in which type of system it is operating and the dual mode radiotelephone (101) then uses the data signal at either the analog input port (104) or the digital input port (105), depending on the type of system.

14 Claims, 2 Drawing Sheets

DATA COMMUNICATION USING A DUAL MODE RADIOTELEPHONE

This is a continuation of application Ser. No. 08/465,040, filed Jun. 6,1995, now abandoned, which is a continuation or application Ser. No. 08/152,160, filed Nov. 15, 1993, now abandoned.

FIELD OF THE INVENTION

The present invention relates to data communications. More particularly, the present invention relates to data communications in a radiotelephone environment.

BACKGROUND OF THE INVENTION

At least two types of cellular radiotelephone systems are operating in the United States, an analog type and a digital type. The analog type, also know in the art as the advanced mobile phone system (AMPS), was the sole cellular system until capacity demands required that another system having greater capacity be utilized. The digital type system, presently implemented using either code division multiple access (CDMA) or time division multiple access (TDMA) schemes, was invented to relieve the capacity problems of AMPS.

Mobile radiotelephones that are designed to operate in one of the digital systems must also have the capability of operating in AMPS. This allows a mobile radiotelephone user to roam from one geographical area with AMPS to another geographical area with one of the digital schemes. Or the user can decide to switch from one type of system to the other while remaining in the same geographical area due to lack of capacity in the other system.

These cellular systems have greatly increased the mobility of the public. Computers and facsimile machines can now be coupled to mobile telephones, thus allowing data communications, in addition to voice communications, from any location having a cellular system installed.

One problem with coupling a computer with a radiotelephone is that, in an analog system, the data from the computer must be converted into an analog format to be compatible with the AMPS format. This requires a modem between the radiotelephone and the computer, adding weight and expense to the configuration. Yet when the radiotelephone switches to a digital system, the modem is not required since the digital data from the computer can just be reformatted into the digital standard's format before transmission. In this case, the user must remember to disconnect the computer from the modem and reconnect the computer to the radiotelephone. There is a resulting need for a data communications apparatus that does not require the user to reconfigure the connections when changing cellular systems.

SUMMARY OF THE INVENTION

The data communications system of the present invention enables data communication in two types of radiotelephone networks. The communication system is comprised of an electronic accessory that generates a first signal. A modulator/demodulator, coupled to the electronic accessory, produces a modulated signal from the first signal. A radiotelephone, coupled to the modulator/demodulator, uses the first signal when it is operating in the first radiotelephone network and the modulated signal when it is operating in the second radiotelephone network.

In a preferred embodiment, the electronic accessory is a computer. Also in the preferred embodiment, the two types of radiotelephone networks are analog and digital so that the radiotelephone uses the digital signal from the computer while in the digital radiotelephone environment and the modulated signal while in the analog radiotelephone environment.

DETAILED DESCRIPTION OF THE PREFERRED EMBODIMENT

Figure 1:
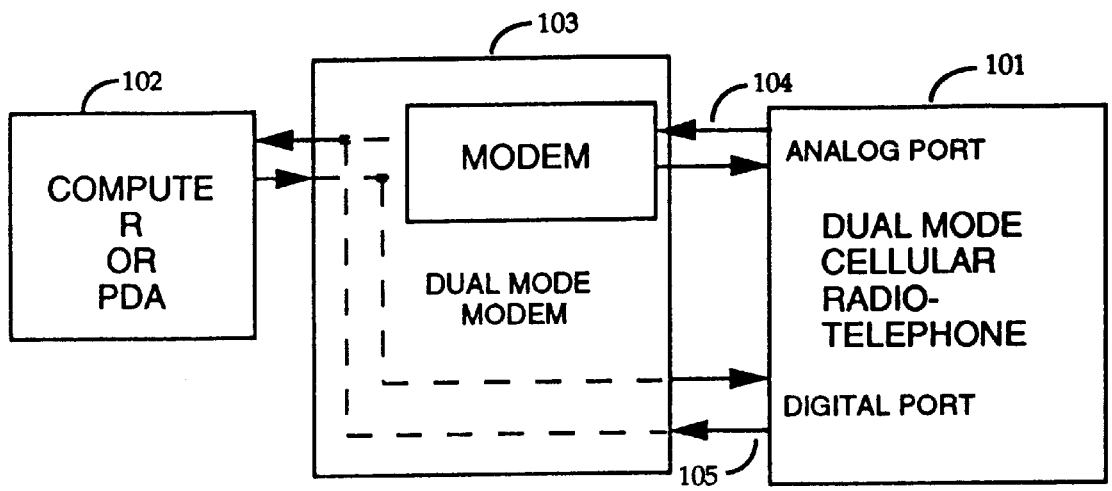
FIG. 1 shows the data communications system of the present invention.

FIG. 1 illustrates a block diagram of the data communications system of the present invention. This system is comprised of a dual mode radiotelephone (101) having two data ports, an analog (104) and a digital (105). These dual ports (104 and 105), in the preferred embodiment, are implemented as a single connector with multiple pins. An alternate embodiment uses separate connectors for each input. Another alternate embodiment multiplexes the output signals onto the same output connector pin.

The analog data port (104) accepts an analog signal that is processed by the radiotelephone (101) in the same manner that a voice signal is processed by the analog mode of the radiotelephone. The signal is then transmitted by the radiotelephone to the base station. The processing performed by the radiotelephone is well known in the art.

The radiotelephone's digital port (105) accepts a digital signal that is processed by the digital mode circuitry of the radiotelephone (101). This digital signal is in the format of the electronic accessory (102) and not the proper format for transmission by the radiotelephone (101). The signal, therefore, must be reformatted into the proper frames for transmission in a digital radiotelephone environment. The formatting of digital data into a frame structure by a radiotelephone is also well known in the art.

The analog and digital ports (104 and 105) are coupled to a dual mode modem (103) that demodulates analog data from the radiotelephone (101) into a digital format for use by the electronic accessory (102) and modulates a digital signal from the electronic accessory (102) into the analog format for the radiotelephone (101) to use. The modem (103) also passes the digital signal through from the electronic accessory (102) without modifying it. In this manner, the electronic accessory (102) coupled to the dual mode modem (103) has two paths to the radiotelephone (101), a digital path and an analog path.

In the preferred embodiment, the dual mode modem (DMM) generates a command to the radiotelephone to determine the radiotelephone's mode. The radiotelephone decodes the command and sends a response back to the DMM depending on its mode. The DMM then sets itself to either pass commands to the radiotelephone or run the analog modem depending on the response.

In an alternate embodiment, the electronic accessory determines the mode of the radiotelephone by sending a command word, requesting the radiotelephone's mode, to the radiotelephone through the digital input. The radiotelephone decodes this word and sends its mode back to the electronic accessory through the digital path. The electronic accessory now knows the correct mode and instructs the dual mode modem to channel the signal to the proper output port of the modem.

The electronic accessory can instruct the modem by pulling a control line between the accessory and the modem to a logic high or low. In an alternate embodiment, the radiotelephone sends a command over a digital bus to the modem instructing it on what to do. In another alternate embodiment, the modem intercepts and interprets the reply from the radiotelephone and sets the proper output port on its own. In yet another alternate embodiment, the data from the electronic accessory is output from both the digital and the analog outputs of the dual mode modem and the radiotelephone decides which input to use depending on the type of radiotelephone system in which it is operating.

Figure 3:
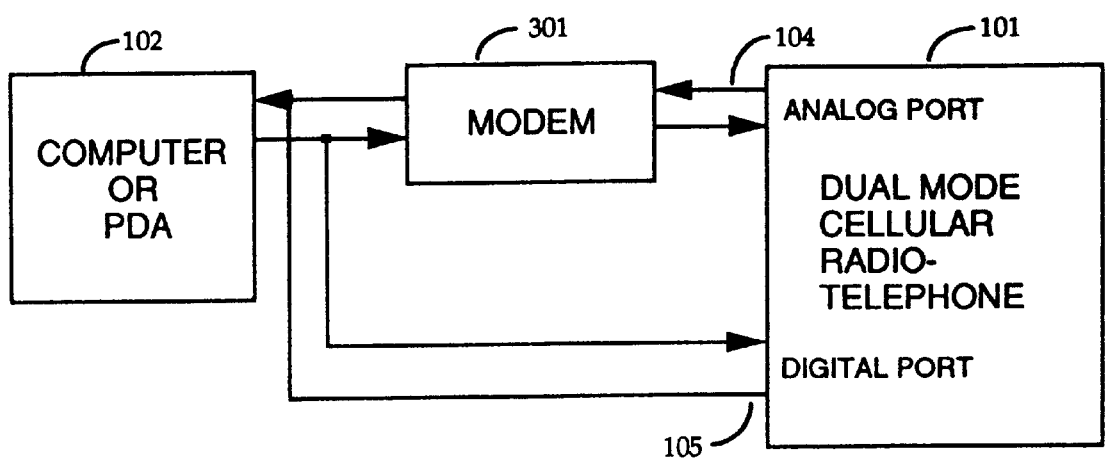
FIG. 3 shows an alternate embodiment of the data communications system of the present invention.

An alternate embodiment of the system of the present invention is illustrated in FIG. 3. This embodiment uses a typical modem (301) to couple the digital output of the electronic accessory (102) with the analog input (104) of the radiotelephone (101). The electronic accessory's output is coupled directly to the digital input (105) of the radiotelephone (101) without going through the modem (103). This embodiment does not require a special dual mode modem. In this embodiment, the electronic accessory (102) outputs the digital signal to both the digital and analog inputs of the radiotelephone (101). The radiotelephone (101) then determines which input to use depending on the type of radiotelephone system in which it is operating.

In the preferred embodiment, the electronic accessory (102) is a computer. An alternate embodiment uses a personal digital assistant as the electronic accessory. Yet another alternate embodiment uses a facsimile/data modem to couple the computer to the radiotelephone. In this embodiment, the electronic accessory can output to the modem either digital data or a digitized facsimile. If facsimile data is output and the radiotelephone is in a digital radiotelephone system, the radiotelephone will use the digital input port. If the radiotelephone is in an analog cellular system, it will use the signal produced by the modem at the analog input port.

Figure 2:
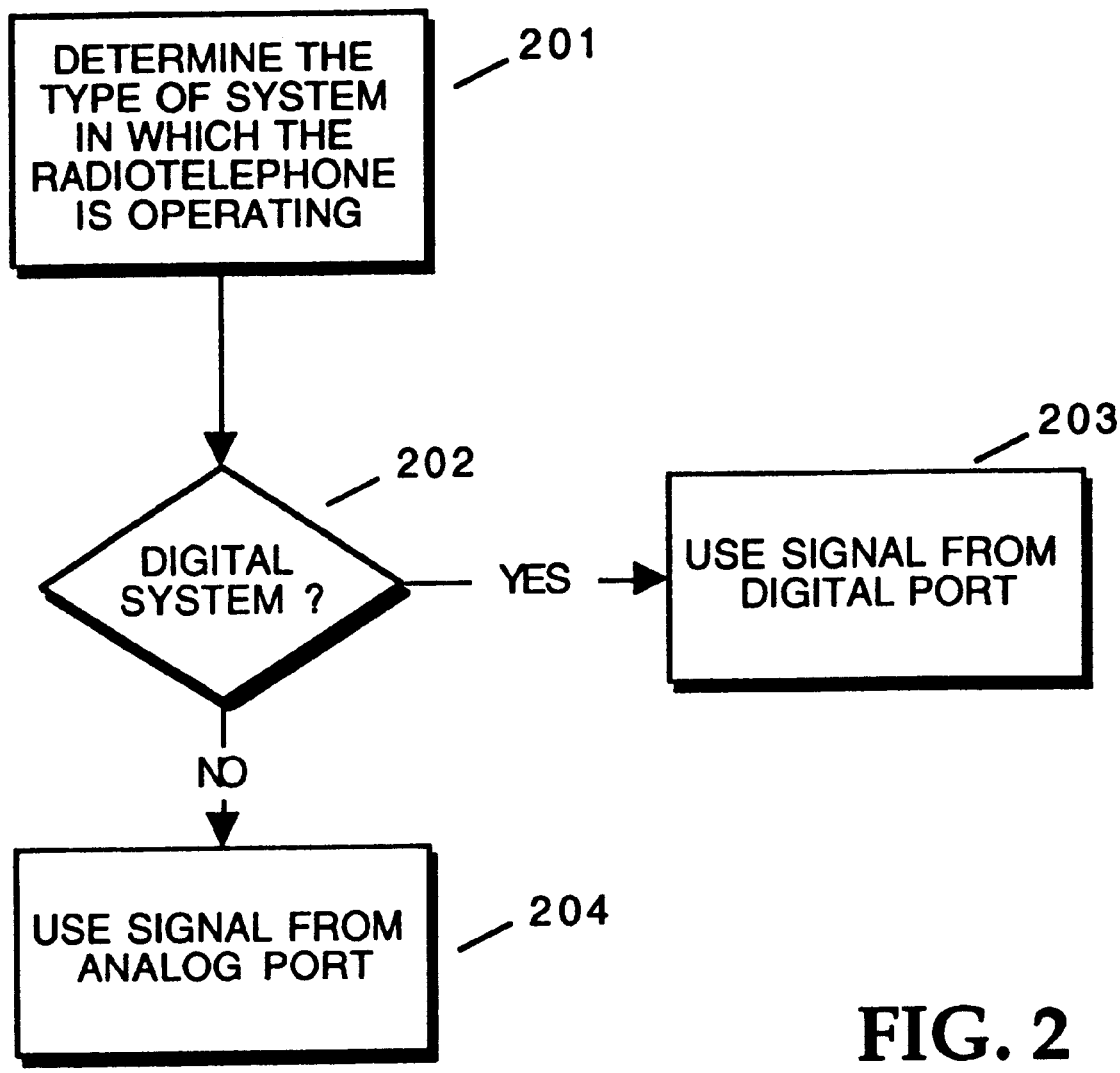
FIG. 2 shows a flowchart of the data communications process of the present invention.

The process of the present invention is illustrated in FIG. 2. This process begins with the radiotelephone determining the type of cellular system in which it is operating (201). This is part of the registration procedure for the radiotelephone and is well known in the art. If the radiotelephone is operating in a digital system (202), either a CDMA system or a TDMA system, it uses the data from it digital input (203). If it is operating in an analog system, it uses the data from the analog input (204).

In summary, the data communications system of the present invention enables a user of an electronic accessory, such as a computer, to go from a digital cellular radiotelephone system to an analog cellular telephone system without changing the connections between radiotelephone and the accessory. The system of the present invention determines the type of cellular system in which the radiotelephone is operating so that the signal at the proper radiotelephone input is used.

I claim:

1. A data communications system for communicating data in a digital radio network or an analog radio network, the data communications system comprising:

an electronic accessory that generates a digital data signal;

a modulator/demodulator, coupled to the electronic accessory, for generating a modulated data signal from the digital data signal; and a radiotelephone, coupled to the modulator/demodulator and said electronic accessory, the radiotelephone having means for determining whether the radiotelephone is in the digital radio network or the analog radio network, means for selecting the digital data signal from the electronic accessory when the radiotelephone is operating in the digital radio network, and means for selecting the modulated data signal from the modulator/demodulator when the radiotelephone is operating in the analog radio network, wherein the radiotelephone communicates the digital data signal when the radiotelephone is operating in the digital radio network and wherein the radiotelephone communicates the modulated data signal when the radiotelephone is operating in the analog radio network.

2. The data communications system of claim 1 wherein the digital radio network is a code division multiple access compatible network and the analog radio network is an advanced mobile phone system compatible network.

3. A method for communicating data with an electronic accessory coupled to a radiotelephone through a modem, the radiotelephone having a digital mode for use in a digital type radiotelephone system and an analog mode for use in an analog type radiotelephone system, the electronic accessory generating a digital signal and the modem generating an analog signal from the digital signal, the radiotelephone coupled to the modem by a first input for accepting the digital signal and a second input for accepting the analog signal, the method comprising the steps of:

determining, in said radiotelephone, whether the radiotelephone is operating in the digital or the analog type radiotelephone system;

selecting, by said radiotelephone, the digital signal from the electronic accessory via said first input when the radiotelephone is operating in the digital type radiotelephone system;

selecting, by said radiotelephone, the analog signal generated by the modem via said second input when the radiotelephone is operating in the analog type radiotelephone system;

the radiotelephone communicating the digital signal when the radiotelephone is operating in the digital type radiotelephone system; and the radiotelephone communicating the analog signal when the radiotelephone is operating in the analog type radiotelephone system.

4. A method for communicating data by a radiotelephone coupled to a computer, the radiotelephone having a digital operating mode for use in a digital cellular radiotelephone system and an analog operating mode for use in an analog cellular radiotelephone system, the method comprising the steps of:

the radiotelephone determining whether to operate in the digital operating mode or the analog operating mode;

the computer interrogating the radiotelephone to determine the operating mode of the radiotelephone; and the radiotelephone indicating the operating mode to the computer.

5. A data communications system for communicating data in a digital radiotelephone network or an analog radiotelephone network, the data communications system comprising:

a computer that generates a digital data signal;

a radiotelephone, having a digital mode and an analog mode, for transmitting and receiving data in the digital and analog radiotelephone networks; and a modulator/demodulator coupling the computer to the radiotelephone, the modulator/demodulator having means for transmitting a mode command to the radiotelephone to determine whether the radiotelephone is operating in the digital mode or the analog mode, means for providing a modulated data signal generated from the digital data signal to the radiotelephone if the radiotelephone is in the analog mode, and means for providing the digital data signal to the radiotelephone if the radiotelephone is in the digital mode, wherein the radiotelephone communicates the digital data signal when the radiotelephone is operating in the digital mode and wherein the radiotelephone communicates the modulated data signal when the radiotelephone is operating in the analog mode.

6. A method for communicating data by a radiotelephone coupled to a computer through a modem, the radiotelephone having a digital operating mode for use in a digital cellular radiotelephone system and an analog operating mode for use in an analog cellular radiotelephone system, the radiotelephone coupled to the modem by a digital input for accepting a digital signal and an analog input for accepting a modulated signal, the method comprising the steps of:

the modem interrogating the radiotelephone to determine an operating mode of the radiotelephone;

the radiotelephone indicating the operating mode to the modem;

the modem providing the digital signal to the digital input of the radiotelephone in response to the radiotelephone operating in the digital operating mode;

the modem providing the modulated signal to the analog input of the radiotelephone in response to the radiotelephone operating in the analog operating mode, the radiotelephone selecting the digital input to retrieve the digital signal when operating in the digital operating mode, and the radiotelephone selecting the analog input to retrieve the modulated signal when operating in the analog operating mode.

7. The method of claim 6 and further including the steps of:

the radiotelephone providing a received signal to the modem;

if the radiotelephone is operating in the analog operating mode, the modem demodulating the received signal;

if the radiotelephone is operating in the analog operating mode, the modem transmitting the demodulated, received signal to the computer; and if the radiotelephone is operating in the digital operating mode, the modem transmitting the received signal to the computer.

8. The data communications system of claim 1 wherein said electronic accessory interrogates said radiotelephone to determine whether said radiotelephone is operating in said digital radio network or said analog radio network and wherein said electronic accessory instructs said modulator/demodulator to provide said digital signal to said radiotelephone when said radiotelephone is operating in said digital radio network and to provide said modulated data signal to said radiotelephone when said radiotelephone is operating in said analog radio network.

9. The data communications system of claim 1 wherein said modulator/demodulator interrogates said radiotelephone to determine whether said radiotelephone is operating in said digital radio network or said analog radio network and wherein said modulator/demodulator provides said digital data signal to said radiotelephone for said radiotelephone to communicate when said radiotelephone is operating in said digital radio network and provides said modulated data signal to said radiotelephone for said radiotelephone to communicate when said radiotelephone is operating in said analog radio network.

10. An interface device in a communication system in which an electronic accessory having a digital data port generates a digital data signal for transmission by a radiotelephone having an analog port and a digital port, said interface device comprising:

a modulator/demodulator, having an accessory input coupled to said digital data port of said electronic assembly and having an analog output coupled to said analog input of said radiotelephone, said modulator/demodulator for generating an analog data signal from said digital data signal and providing said analog data signal to said radiotelephone at said analog input; and a transmission line, coupled at a first end to said digital data port of said electronic assembly and coupled at a second end to said digital port of said radiotelephone, said transmission line for passing said digital data signal to said radiotelephone.

11. The interface device of claim 10 wherein said electronic accessory interrogates said radiotelephone through said interface device to determine whether said radiotelephone is operating in a digital mode or an analog mode, and wherein said radiotelephone indicates to said electronic accessory, in response to said interrogation, through said interface device whether said radiotelephone is operating in said digital mode or said analog mode.

12. The interface device of claim 10 wherein said modulator/demodulator transmits a mode command to said radiotelephone to determine whether said radiotelephone is operating in a digital mode or an analog mode, said modulator/demodulator generating a modulated signal from said digital data signal if said radiotelephone is in said analog mode, and said modulator/demodulator conducting said digital data signal to said radiotelephone if said radiotelephone is in said digital mode.

13. A mobile telecommunications system for communicating data over either of a digital radio network and an analog radio network, comprising:

an electronic device for generating unmodulated digital data signals;

a modulator/demodulator coupled to said electronic device for modulating said digital data signals; and a remote communications device coupled to said modulator/demodulator for communicating by radio signals with one or more base stations, said remote communications device having:

mode determining means for determining when said remote communications device is operating in a digital radio network environment and in an analog radio network environment; and means for transmitting said unmodulated digital data signals directly between said electronic device and said one or more base stations when said mode determining means determines that said remote comunications device is operating in a digital radio network environment and for transmitting modulated digital data signals when said mode determining means determines that said remote comunications device is operating in an analog radio network environment.

14. An interface device for use with a mobile telecommunications device for communicating with one or more base stations over either of a digital radio network and an analog radio network, comprising:

a modulator/demodulator for modulating digital data signals generated by an electronic device;

mode determining means for determining when the remote communications device is operating in a digital radio network environment and in an analog radio network environment; and means for transmitting unmodulated digital data signals generated by the electronic device directly between the electronic device and the one or more base stations when said mode determining means determines that the remote comunications device is operating in a digital radio network environment and for transmitting modulated digital data signals when said mode determining means determines that the remote comunications device is operating in an analog radio network environment.

* * * * *